PLUG-IN SPONGE
Original Filed Aug. 30, 1965 2 Sheets-Sheet 1
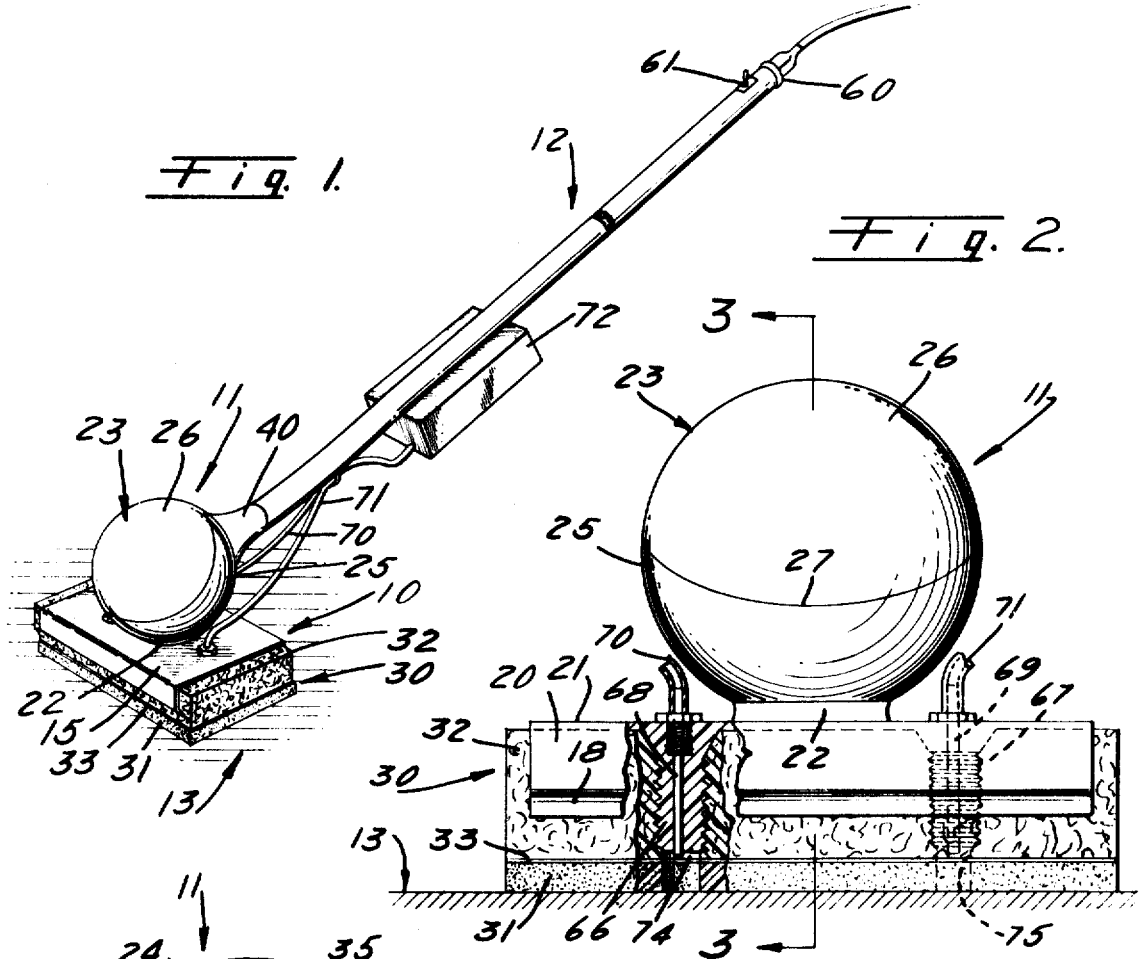
INVENTOR.
Harold T. Sawyer
BY Beehler & Arant
Attorneys

PLUG-IN SPONGE

Original Filed Aug. 30, 1965 2 Sheets-Sheet 2

Harold T. Sawyer
INVENTOR.

BY Beehler & Arant
Attorneys

United States Patent Office

Re. 26,937
Reissued Aug. 18, 1970

26,937
PLUG-IN SPONGE

Harold T. Sawyer, Pacific Palisades, Calif., assignor of seventeen and one-half percent to Vernon D. Beehler, Los Angeles, Calif.

Original No. 3,402,009, dated Sept. 17, 1968, Ser. No. 483,463, Aug. 30, 1965, which is a continuation-in-part of Ser. No. 480,310, Aug. 17, 1965. Application for reissue Sept. 16, 1969, Ser. No. 862,994
Int. Cl. A47l *3/30*
U.S. Cl. 401—266 6 Claims

Matter enclosed in heavy brackets [ ] appears in the original patent but forms no part of this reissue specification; matter printed in italics indicates the additions made by reissue.

ABSTRACT OF THE DISCLOSURE

In a disclosure in which the invention is embodied there is provided a receptacle for retention of a composite sponge by means of which the sponge can be manipulated in one position or another over the surface upon which work is to be performed. The sponge has two different effective working surfaces, namely a relatively thick sheet of substantially conventional absorbent spongy material on one side and a relatively thin sheet of abrasive material on the opposite side. The composite sponge or pad is removable from the holder and reversible in position so that the different sheets can be used alternatively. The sheets are fastened together by a special adhesive and the adhesive selected is one which form a barrier between the sheets so that liquid cannot pass from one sheet to the other. Consequently, if some sort of liquid cleaner can be advantageously used between the abrasive sheet and the surface being cleaned, the liquid cleaner will not be absorbed into the sponge on the opposite side. On those occasions where liquid cleaner is supplied from a reservoir, a liquid passage is provided extending entirely through the entire pad so that the liquid cleaner can pass from the reservoir to the surface being cleaned without being absorbed into the absorbent sheet when the abrasive sheet is in contact with the surface being cleaned. The liquid cleaner moreover can reach the surface being cleaned even though the abrasive sheet is nonabsorbent, because of the hole passing also through the abrasive sheet. In order to keep the pad from shifting in position in the holder, the illustrative disclosure makes use of bosses on the interior of the holder extending into holes in the pad and the engagement thus provided functions no matter which side of the pad faces upwardly.

This is a continuation-in-part of copending application, Ser. No. 480,310, filed Aug. 17, 1965, and now Patent No. 3,357,033.

The invention relates to cleaning devices especially advantageous for cleaning and conditioning of flat surfaces such as floors, walls and ceilings. More particularly, the invention relates to a cleaning tool which relies primarily for its effectivensss upon a source of sonic energy.

Household cleaning of large surface areas such as, for example, floors and walls, requires considerable physical energy and time if a quality cleaning job is to be attained. In addition, the problems generally are known to be twofold. First, energy means is required to loosen and free the dirt and contamination from said surface, and secondly, the loosened dirt, contamination, and cleaning fluid must then be removed from said surface and in such a manner as to leave the surface clean and in a condition which is substantially dry or moist.

Household cleaning of said surfaces is generally accomplished with the use of a conventional sponge, sponge mop, conventional mop, rags, etc., and in combination with various types of cleaning fluids. The quality of cleaning is in most cases directly related to the energy expended in the cleaning or scrubbing process. One of the difficult problems in floor cleaning, for example, is to remove contaminated wax from waxed floors by manual means.

Although there are commercially available methods and devices for scrubbing, cleaning, and removal of resultant contamination from floors, such methods and devices involve more than one piece of equipment, and the physical size, weight, and cost is a deterrent to household use, and particularly with respect to wall cleaning applications.

It is, therefore, an object of this invention to provide a new and improved device for sound wave energy surface cleaning, the device being portable and preferably being capable of operating at lower power.

Another object of the invention is to provide a new and improved surface conditioning device making use of sound energy which is light in weight, low in cost, capable of operating at exceptional efficiency, and whereas the maximum effect is in a direction substantially vertical with respect to the surface being conditioned.

Another object of the inveniton is to provide a new and improved surface conditioner pad making use of sound wave energy of relatively high amplitude and intensity in the lower sonic range which works rapidly and effectively and which can be adapted not only to clean surfaces but also to remove the contamination and cleaning fluid after cleaning and subsequently, if desired, recondition the surface.

With these and other objects in view, the invention consists in the construction, arrangement, and combination of the various parts of the device, whereby the objects contemplated are attained as hereinafter set forth, pointed out in the appended claims and illustrated in the accompanying drawings.

In the drawings:

FIGURE 1 is a side perspective view of an embodiment of the surface conditioning device.

FIGURE 2 is an end elevational view partially broken away.

FIGURE 3 is a horizontal sectional view of line 3—3 of FIGURE 2.

FIGURE 4 is a fragmentary longitudinal sectional view of another type of work holder.

Figure 5:
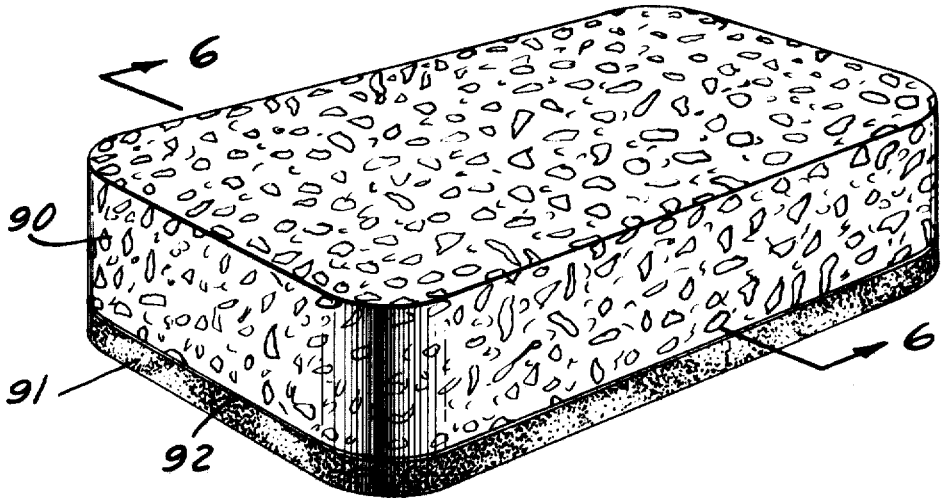
FIGURE 5 is a perspective view of a pad of slightly different proportions.

In an embodiment of the device chosen for the purpose of illustration there is shown a work holder indicated generally by the reference character 10 upon which is mounted a source of sound energy 11 and to which is attached a handle 12. The device is shown mounted for operation upon a surface 13 which is to be conditioned.

The work holder consists of a relatively rectangular body 15 providing a chamber 16. Inwardly directed beveled edges 17 and 18 at the ends of respective side walls 19 and 20 define sides of the chamber 16. Opposite ends of the chamber are open, as readily appears from the examination of FIGURES 1 and 2.

Substantially central on the upper face 21 of the body 15 is a pedestal 22. This may be molded integrally with the body 15, if desired, or, on those occasions where the body 15 is of sheet metal, the pedestal may be fastened to it in some appropriate conventional way. Attached to the pedestal 22 is a rounded shell 23, which in the chosen embodiment is spherical and provides a chamber 24. In the embodiment here under consideration the shell consists of a lower section 25 and an upper section 26. The lower section 25, if desired, may be molded integrally with the pedestal 22 and the body 15, especially under those circumstances where these parts are made of some appropriate synthetic plastic resin material such as Fiberglas. When the lower section 25 and upper section 26 are separately molded as complementary portions, they may be joined together along a circumferential line 27 by use of an annular ring 28 and an appropriate adhesive.

A pad indicated generally by the reference character 30 is herein shown in the form of a substantially two-part spongy material consisting of a lower sheet 31 and an upper sheet 32, attached and bonded together by a layer 33 of adhesive bonding material which is impervious to fluids. For many types of cleaning operation as, for example, for stripping wax and contamination from a floor and thereafter cleaning the floor preparatory to re-waxing and buffing, the lower sheet 31 may be made of some appropriate semi-abrasive type of material, such as stiff nylon fiber, a brush-like material, or merely a retaining semi-open material in which is embedded some granular abrasive such as powdered flint or silica carbide.

The upper sheet 32 is preferably one form or another of conventional natural or porous cellulose sponge which is capable of absorbing many times its weight in water. The pad 30, in the form shown, is substantially rectangular and wide enough so that it can be jammed snugly into the chamber 16 by compressing side portions of the upper sheet 32 enough to be securely engaged by the beveled edges 17 and 18. The sponge can be inserted merely by compressing it slightly after it is sufficiently moistened and can be removed merely by deforming it or reversing it so that the lower sheet 31 is uppermost and then re-inserting it when slightly deformed, after which it will expand and remain snugly in position.

The source of sound energy is embodied primarily in the mass of motor 35 contained in a housing 36. A projection 37 at one end of the motor housing is provided with a coiled wire supporting sleeve 38 which provides a resilient mounting for that end of the housing 36 in a bore 39 within the block 40. A set screw 41 extending through the block 40 and into engagement with the coiled wire sleeve 38 is useful for retaining it in position. A widened portion 42 of the bore provides room for movement of the adjacent end of the projection 37.

An end portion 43 of the housing 36 has a motor shaft 44 protruding therefrom into engagement with a crank 45. Extending from the crank 45 is a stub shaft 46 which has a substantially universal connection to a bearing housing 47. The bearing housing is mounted at the upper free end of a leg 48. At its outer or lower end the leg has a pedestal base 49 attached to the pedestal 22 by means of appropriate screws 50, 51 together with an appropriate epoxy adhesive. Under certain circumstances the screws or the adhesive may be used separately.

Wires 55 and 56 which supply an electric motor 35 located in the housing 36, pass through a potting compound 57 in a passage 58, the potting compound serving as a sound wave isolation and absorbing medium as well as a sealant. The wires 55 and 56 then extend through a hollow interior 59 of the handle 12 and extend outwardly through a cap 60. An on-off switch 51 may be connected in one or another of the wires. Absorbent wafers 62, 63, etc., through which the wires pass are provided at staggered location in the handle and serve to prevent passage of sound wave energy lengthwise through the handle. The handle is attached by an appropriate resilient adhesive 64 to a stub 65 of the block 40.

As a further convenience, bosses 66 and 67 extend into the chamber 16 from the underside of the body 15 and are provided with roughened exteriors in the form of multiple rings. Tubes 68 and 69 extend through the respective bosses and are fed by respective hoses 70 and 71 which lead from a reservoir container 72. A remote control 73, connected in a conventional way (not shown), may be used to control the passage of liquid from the reservoir container 72 into the hoses 70 and 71. Holes 74 and 75 in the pad 30 accommodate the bosses 66 and 67 and assist both in positioning the pad in the work holder and in retaining it in place once in position: Liquid applied to the surface 13 passes through the holes 74 and 75.

For operation other than those for which the pad 30 is designed, there may be employed a pad 80, shown in FIGURE 4, which fits in the work holder 10 in the same manner as does the pad 30. The pad 80 has a sheet 81 of water absorbent spongy and cellulosic material, on opposite faces of which may be attached buffing sheets 82 and 83 by use of an appropriate flexible adhesive layer 84 in each instance. For some uses the buffing sheets 82 and 83 may be sheep's wool or other appropriate buffing material.

It is significant that even though the pedestal 22 has an appropriable area, it is located on one side only of the holder 15 and on one side only of the shell 23 and the base 49 which together may be considered elements of a mount for the source of and transmission of sonic energy. Further still, by having the right end of the housing 36 resiliently mounted, as viewed in FIGURE 3, and the left end eccentrically mounted, the motor 35 in the housing 36 provides a power actuated cyclically movable mass supplied with electrical energy through the wires 55 and 56. Good results are produced when for a 110 volt source of electrical energy a motor operating at somewhere between 45 and 70 watts is made use of capable of generating relatively low frequency sound waves typically between 50 and 150 cycles per second.

The rotational mass of the motor 35 which is mounted within and protected by its encompassing shell cover 23, is cyclically driven in a rotational manner about its eccentric bearing and housing 47 and produces a sinusoidal driving force in a vertical downward direction at its pedestal base 22. In the present instance, the source of power resides in the motor 35 on its specifically designed mount. The mechanical energy thus developed by the rotational mass 35 is transmitted to the work holder 10 which is of infinitely smaller mass than that of the rotational driving force mass of 35. In order to take full advantage of this driving force relationship in terms of essential requirements set forth, the center of the radius of gyration of the rotating mass 35 is located directly above, and in line with, the center of work holder 10 and in such fashion that the resultant mechanical energy thus released is coupled to the work holder 10 in a near dynamically balanced condition. The mechanical energy of specific nature thus developed and released within the light mass of the work holder 10 causes the material of said work holder to be displaced on either side of equilibrium in a downward perpendicular direction in alternate periods of compression and tension and in sinusoidal fashion and at a fundamental frequency which is in phase and similar to the rotational velocity of the mass of the motor 35.

It is significant to this invention that the work holder 10 is constructed of thin and stiff material of very light weight and resilient in texture in order that it may freely resonate at the fundamental frequency of the energy source. The resultant frequency of the mechanical energy thusly generated in the work holder is analogous to the action of a loud-speaker diaphragm which has been displaced mechanically and in sinusoidal fashion by the mechanical energy of an armature of an oscillator coil.

The resultant resonant mechanical energy, at a particular frequency, thusly generated within the embodiment of work hold 10 is transformed, for the most part into compressional sound waves which are launched and transmitted vertically downward from the inner surface of work holder 10. In the present embodiment of this invention, the work holder 10 serves also as a directional coupler for directional transmission of sound wave energy and mechanical energy through the pad 30 and in a perpendicular direction to and releasing said energy at the surface 13. The amount of sound wave energy and mechanical energy thus transmitted to the surface 13 is proportional to the angular velocity of the rotational mass and the product of its displacement from its center of mass from the rotational axis.

For purposes relating to this invention, it is significant that the sonic energy thus released at the surface 13 is of extraordinary high amplitude and intensity thus enabling the lower sheet 31 of pad 30 to quickly penetrate and remove the surface contamination from the floor surface. The energy thusly released at the surface 13 is for the most part a combination of sound wave and mechanical energy in the lower sonic range and which is transmitted in a perpendicular direction to said surface. In addition, there is another source of mechanical energy, of much lesser amount, and which originates from the moment of inertia of the rotational mass of motor 35, and which energy causes a limited lateral motion of the pad which is a right and left motion as viewed in FIG. 2. This motion coupled with the third energy motion, namely that of pushing the work holder and pad combination back and forth in line with the handle 12 across the floor surface produces a combination of three energy motions which work together effectively and rapidly at the surface.

The most effective source of energy in the cleaning operation is performed by the compressional sound wave energy which is directed to the surface 13. This wave energy, which is in the lower sonic range, is known to have excellent penetrative quality, and the waves are efficiently transmitted through the moist sheets of the pad 30 and into the floor surface and at a velocity approximating 4800 ft./sec. during the cleaning cycle. Since said sonic wave energy has exceptionally high amplitude, the alternate reversals of said wave energy at its respective fundamental frequency, causes an exceptional amount of cavitation within the pad 30 and within the contacted cleaning fluid on the surface 13. The cavitation thus produced within the pad and within the cleaning fluid at contact on the surface produces in combination with the reversal of energy cycles alternate cyclic periods of pressure and tension at the surface which in turn produces an implosion effect which tends to loosen and rip away the wax and contamination from the surface. This effect is somewhat analogous to the implosion effect produced by ultrasonic wave energy when used for cleaning the surfaces of materials within a fluid bath.

If the cleaning operation be one for removing wax and contamination from a floor surface, some appropriate fluid detergent can be merely spread around the surface either from the reservoir 72 or otherwise and the lower sheets 31 passed entirely over the surface while the source of energy is kept operating. This is sufficient to effectively dislodge wax and contamination from the surface. Dislodgment is appreciably increased when the lower sheet 31 is of mild abrasive resilient material.

After the wax has been loosened, the pad is reversed so that the upper absorbent sheet 32 is exposed on the bottom. The pad is then again passed over the entire surface while the source of sonic energy is operating and acts to pick up the loosened wax particles. When a floor is thus to be stripped of wax and contamination, it is advantageous to rinse the floor once or twice to be certain that it is entirely cleaned of the dislodged wax. The rinsing can be done with a moderate amount of water in the sheet 32 and by using the upper absorbent sheet 32 of the pad in a position wihch makes floor contact. The rinsing is done with the device energized.

If the surface is to be rewaxed, an appropriate liquid wax can be poured upon the surface and spread with the buffing sheet 82 without the source of sound energy being operating. When finally spread, the pad 80 can be reversed exposing the buffing sheet 83. Then with the source of sound energy operating, the buffing sheet 83 is passed rapidly over the surface and the surface is in this manner satisfactorily buffed.

Although the description has been directed primarily to a floor as the surface 13 by way of example, and a wax and contamination removing operation has been used as an illustration, walls and ceilings which are soiled or dirty can be cleaned equally advantageously. The orientation of the handle 12 with the work holder 10 is such that the work holder and the pads can be kept substantially flat against the surface while the sundry operations are being performed. Moreover, when the shell is made liquid tight the entire lower end of the device may be immersed in liquid, should that be necessary at any time, and without damage or harmful effects to the tool. It is significant to this invention that the layer of adhesive bond material 33 between the sheets 31 and 32 be one which is impervious to the passage of liquid so that when a surface is being cleaned, as by use of a detergent, the detergent will not be absorbed into the upper sheet 32. Thereafter, when the pad 30 is reversed, the upper absorbative sheet 32 becomes available to absorb the mixture of dirt, detergent, and water from the surface. Although a pad 30 of a specific type has been described in detail, it will be appreciated that other pads differently designed may be used for other purposes.

Figure 6:
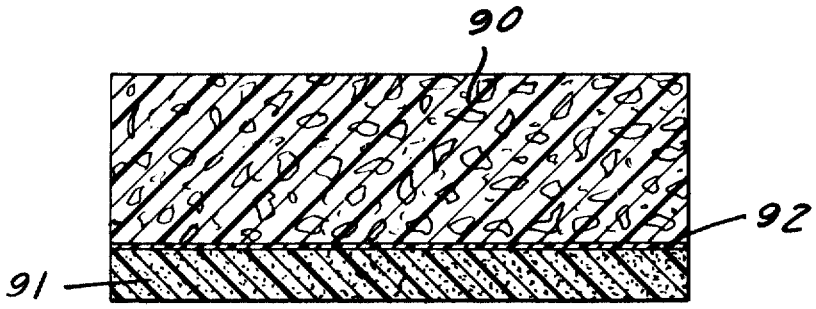
FIGURE 6 is an end elevational view of the device of FIGURE 5.

In the form of device of FIGURES 5 and 6 a pad is shown having slightly different proportions than the pads described heretofore in that corners are rounded and no holes are provided. The pad of FIGURES 5 and 6 is one also capable of being used in an appropriate pad holder like the work holder 10 but wherein bosses like the bosses 66 and 67 have been omitted.

In the pad of FIGURES 5 and 6 there is shown an upper sheet 90, a lower sheet 91, and an intermediate adhesive layer 92. The upper sheet 90 is preferably a cellulosic sponge material two or three times thicker than the lower sheet 91.

In this form of device it is important that the lower sheet 91 be entirely flexible. For that purpose it can be one of nylon or other synthetic fiber which is inherently abrasive. Should some different material be used such as a cloth material with a raised nap, for example, the raised nap can be impregnated with some suitable abrasive, either mild or strong depending upon the use to which the device is to be put.

It is further of importance that the adhesive layer 92 be equally flexible. The function of the adhesive layer is to provide an impervious layer between the two sheets 90 and 91, which, in addition to firmly securing them to each other, prevents the passage of liquid from one sheet to the other. Further by assuring that the adhesive layer is completely flexible, the entire pad then is a flexible mass which can be squeezed to squeeze out any liquids which may have been absorbed into it and immersed in water to thoroughly clean the pad after use.

Constructed in this fashion the pad is one which can be used by hand or by inclusion in a work holder which itself can be operated by hand instead of by machine. The sheet 91 may first be used to clean a surface, with or without use of a detergent, soap or other cleanser during which time the sheet 90 may be kept dry or moistened to a degree. After the surface has been cleaned, the pad can be turned upside down and the sheet 90 then used as an adsorbent sponge to pick up the cleaning material, then rinsed and cleaned and subsequently used to rinse the surface and pick up all the moisture, both soil laden moisture and the moisture used for rinsing.

When a pad like that described in company with FIGURES 5 and 6 are used in a holder like that described in company with FIGURES 1 through 3, holes are normally provided to receive the bosses 66. Where no use is made of tubes 68 the bosses could be solid and serve solely to hold the sponge in the holder. One such boss is sufficient. Held in this fashion the two sided sponge can be used for limited strippings and cleaning without motor power being employed. The sponge holder and handle are then a hand operated tool. For limited use a holder without a boss may on some occasions suffice.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is;

1. [In a cleaning device a] *A* work pad comprising opposite exterior sheets and an adhesive layer joining said sheets, the area of said adhesive layer being coextensive with adjacent face areas of both said sheets, said adhesive area being impervious to the passage of liquid throughout the entire area thereof, one of said sheets being of flexible material having an abrasive character, the other of said sheets being of flexible, spongy, adsorptive material when wet.

2. [In a cleaning device a] *A* work pad comprising opposite exterior sheets and a flexible adhesive layer joining said sheets, the area of said adhesive layer being coextensive with adjacent face areas of both said sheets, said adhesive area being impervious to the passage of liquid throughout the entire area thereof, one of said sheets being of flexible material having an abrasive character, the other of said sheets being of flexible, spongy, absorptive material when wet, the thickness of said other sheets being greater than the thickness of said one sheet.

3. In a cleaning device a holder comprising a body of sheet material having a top and side walls forming a chamber, at least one boss extending from the inside surface of said top inwardly into the chamber, said boss having a liquid passage therethrough, and a work pad adapted to be retained in said chamber, said pad comprising opposite exterior sheets and a flexible adhesive layer of material joining said sheets, said adhesive layer being impervious to the passage of liquid, one of said sheets being of flexible material having an abrasive character, the other of said sheets being of flexible, spongy, absorptive material when wet, the thickness of said other sheet being greater than the depth of said chamber, said pad having a hole therethrough in substantial alignment with the boss and of diameter smaller than the outside diameter of said boss.

4. In a cleaning device a holder comprising a body of sheet material forming a chamber, bosses on said body extending inwardly into the chamber, said bosses having liquid passages therethrough, and a work pad adapted to be retained in said chamber, said pad comprising opposite exterior sheets and a flexible adhesive layer of material joining said sheets, said adhesive layer being impervious to the passage of liquid, one of said sheets being of flexible material having an abrasive character, the other of said sheets being of flexible, spongy, absorptive material when wet, said pad having holes therethrough in substantial alignment with the bosses and of diameter smaller than the outside diameter of said bosses.

5. In a cleaning device a holder comprising a body of sheet material having a top and side walls forming a chamber, and inwardly directed edges on said side walls, bosses extending from the inside surface of said top inwardly into the chamber, means providing a roughened exterior on said bosses, said bosses having liquid passages therethrough, and a work pad adapted to be retained in said chamber, said pad comprising opposite exterior sheets and a flexible adhesive layer of material joining said sheets, said adhesive layer being impervious to the passage of liquid, one of said sheets being of flexible material having an abrasive character, the outer of said sheets being of flexible, spongy, absorptive material when wet, the thickness of said other sheet being greater than the depth of said chamber, said pad having holes therethrough in substantial alignment with the bosses and of diameter smaller than the outside diameter of said bosses when positioned in said chamber.

6. In a cleaning device a holder comprising a body of sheet material having a top and side walls forming a chamber, and a work pad adapted to be retained in said chamber, means within said holder in engagement with said pad for preventing lateral shifting of said pad in the holder, said pad comprising opposite exterior sheets and a layer of adhesive material joining said sheets, said adhesive layer being impervious to the passage of liquid, one of said sheets being of flexible material having an abrasive character, the other of said sheets being of flexible, spongy, absorptive material when wet, the thickness of said other sheet being greater than the depth of said chamber, said pad having a hole through all of said sheets and in communication with the holder for passing liquid from said holder through the pad.

References Cited

The following references, cited by the Examiner, are of record in the patented file of this patent or the original patent.

UNITED STATES PATENTS

| | | | |
|---|---|---|---|
| 1,795,673 | 3/1931 | Poschinger | 15—569 |
| 2,577,872 | 12/1951 | Berndsen | 15—567 |
| 3,000,040 | 9/1961 | Carlson | 15—567 |
| 3,012,265 | 12/1961 | Courtenay | 15—244.4 |

FOREIGN PATENTS

| | | |
|---|---|---|
| 1,357,507 | 2/1964 | France. |

LAWRENCE CHARLES, Primary Examiner